United States Patent [19]

Ungerman

[11] 4,023,902
[45] May 17, 1977

[54] INDICIA ENCODING SYSTEM
[75] Inventor: Warren J. Ungerman, Hatboro, Pa.
[73] Assignee: West Point Industries, West Point, Pa.
[22] Filed: Apr. 12, 1976
[21] Appl. No.: 675,915
[52] U.S. Cl. .................................... 355/52; 35/2; 350/167; 354/125
[51] Int. Cl.[2] .................. G09C 1/00; G03B 27/68; G02B 27/00; G03B 1/00
[58] Field of Search ............. 350/162 SF, 167, 130; 352/38; 354/101, 102, 110, 112; 346/76 L, 107 R; 355/77, 40, 52; 35/2

[56] References Cited
UNITED STATES PATENTS

| | | | |
|---|---|---|---|
| 1,933,953 | 11/1933 | Ames | 354/109 X |
| 2,172,283 | 9/1939 | Kirby et al. | 354/125 |
| 3,099,195 | 7/1963 | Goodbar | 354/125 |
| 3,166,625 | 1/1965 | Brumley | 350/167 |
| 3,178,993 | 4/1965 | Ferris et al. | 350/167 |
| 3,937,565 | 2/1976 | Alasia | 350/167 X |

Primary Examiner—Donald A. Griffin
Attorney, Agent, or Firm—Larson, Taylor & Hinds

[57] ABSTRACT

An indicia encoding system including an lenticular lens is provided for the pictorial encoding of indicia so that once encoded such indicia can be readily decoded using a viewer provided with a similar lenticular lens. The indicia encoding system comprises a carriage that is pivotally mounted on a base and has a rotation mode between an initial tilting position and a final tilting position. A photosensitive film holder with the lenticular lens affixed thereto is mounted onto the carriage and is slidably positionable, by a cam activated linkage, parallel to the pivotal axis of the carriage for exposing to light transmitted through an objective lens only selected portions of the photosensitive film during each carriage rotation mode. The objective lens is suppoted by a lens holder such that the lens is positioned inside a bellows that extends from the film holder to the lens holder. The additional length of the bellows extending past the lens to the lens holder increases the degree of the deformability of the bellows and thus allows the film holder to move more freely relative to the lens holder. Further the indicia encoding system comprises a holder for the indicia that is pivotally mounted and has a rotation mode synchronized to the rotation mode of the carriage. A picture of the indicia taken through the lenticular lens during the synchronized rotational modes of the film holder and the indicia holder causes the indicia as photographed to be illegible until viewed through a viewer having a lenticular lens.

15 Claims, 9 Drawing Figures

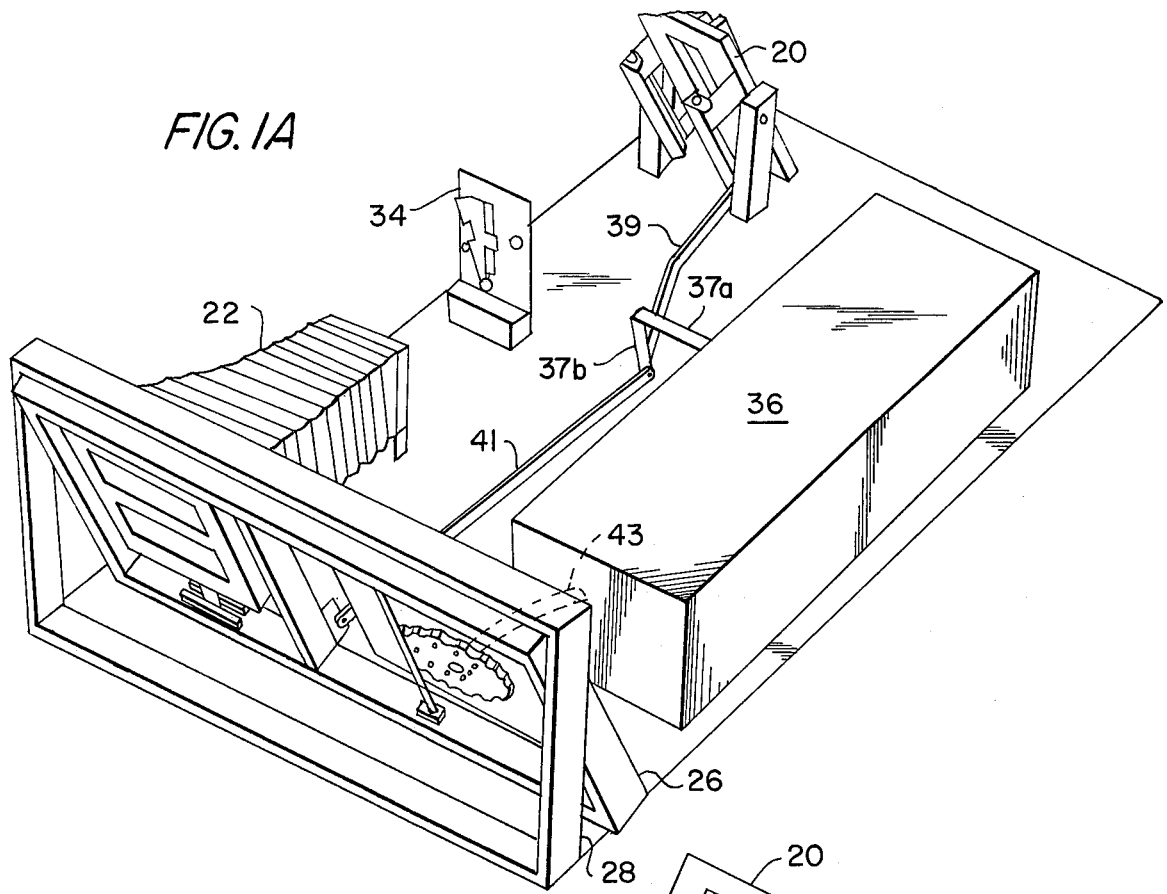
FIG. IA
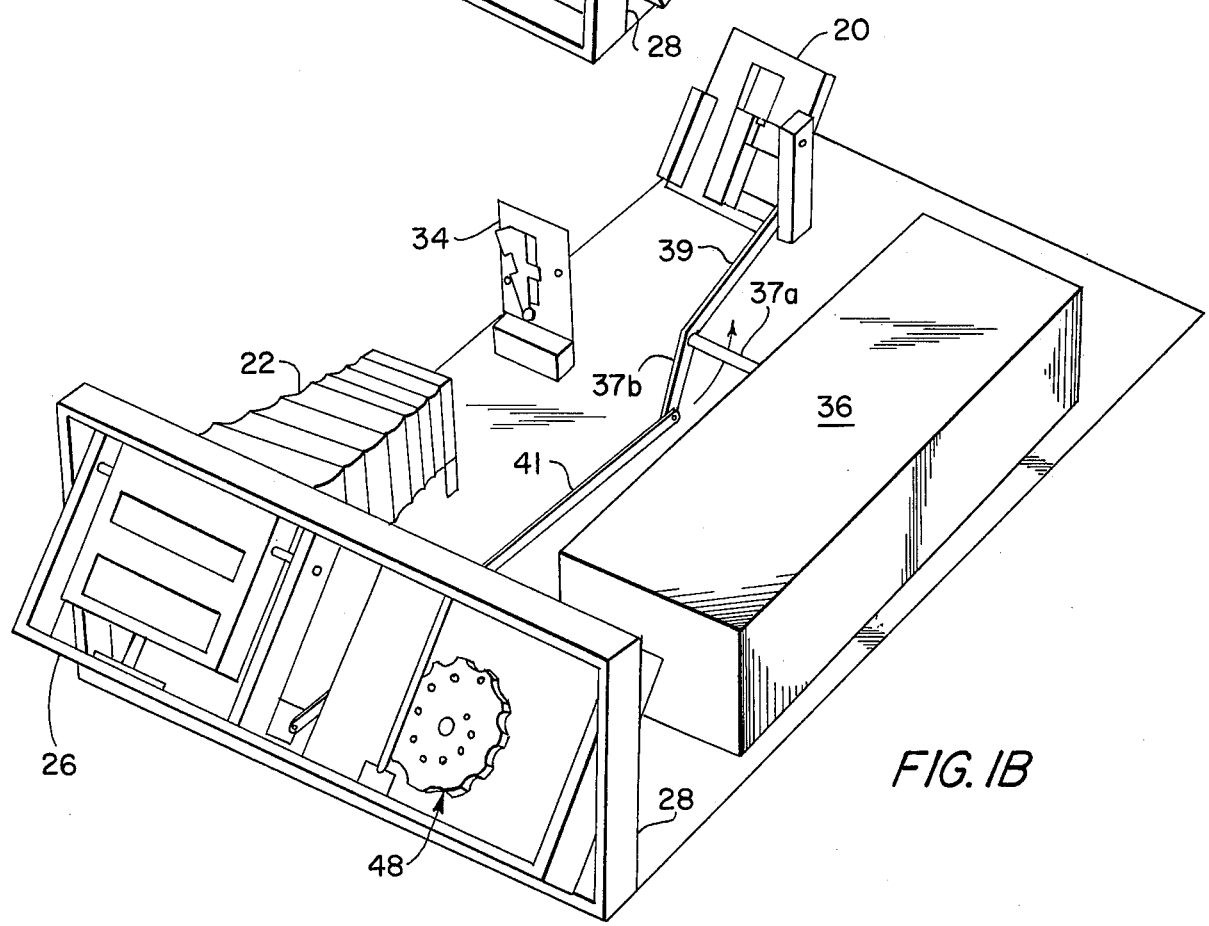
FIG. IB

INDICIA ENCODING SYSTEM

BACKGROUND OF THE INVENTION

1. Field of the Invention

This invention relates to indicia encoding systems and, more particularly, to a system including a camera with a lenticular lens that has a rotational mode synchronized to a rotational mode of the indicia for producing a picture of scrambled or coded indicia.

2. Description of the Prior Art

With the proliferation of credit and identification cards, and especially with the energence of cash retrieval cards associated with electronic fund transfer systems that can allow ready and complete access to financial accounts, a need arises to protect the cardholder from unauthorized use of the card. Generally, information such as account numbers and signature styles are readily available from the face of these cards, and especially in the case of most credit cards no protection is provided from unauthorized use of the account number or duplication of the signature style. Consequently, if this information could be encoded, and readily decoded for authorized use only, the losses due to unauthorized use could be reduced.

A present method for encoding such indicia, which is proving to be of increasing usefulness, is incorporation of a graticule, such as a lenticular lens, into a photographic system. A variety of lenticular lenses are available. One type lens has, for example, a plurality of tiny corrugations embossed therein. Another type of lens comprises a multiple array lens. Both lenses encode the light patterns projected by the photographic system onto photosensitive film. This encoded pictorial representation of the information can readily be decoded by placing the representation into a viewer that has been provided with a lenticular lens similar to the one in the photographic system. Thus, encoded representation of a signature and an account number can, for example, be affixed to a banking card and used during banking transactions for signature and account verification purposes. Such indicia encoding and decoding devices are, for example, discussed in U.S. Pat. Nos. 3,178,993 and 3,676,000.

A method for providing further encoding comprises the use of a lenticular lens in conjunction with an objective lens and photosensitive film, any combination of which can be placed in motion relative to one another to create the encoded pictoral representation of the indicia. An example of such a system can be found in U.S. Pat. No. 3,937,565. In addition, camera type apparatus, that are employed in such a method can be found in U.S. Pat Nos. 3,524,395 and 3,769,890.

An indicia encoding system developed for the Girard Bank of Philadelphia incorporates various aspects of the above-referenced patents. The Girard system includes a camera with a lenticular lens mounted to the film holder of the camera. The film holder is designed to move relative to the objective lens of the camera as an exposure is made and to index after each exposure so that in cooperation with a shutter, a plurality of exposures can be taken on each piece of photosensitive film. Further, the indicia being encoded is placed in a pivotally mounted holder that pivots in synchronism with the film holder during each exposure to provide for, in cooperation with the lenticular lens, indicia encoding.

The Girard system suffers from several disadvantages. One of these disadvantages is that the mounting apparatus that provides for the motion of the film holder relative to the objective lens and the indexing motion between exposures is unreliable, in that it has a tendency to bind up, and thus render the system inoperable.

Another disadvantage is that this system produces an encoded picture that is the same size as the original indicia. Thus, the original indicia has to be initially small enough so as to be affixable to a credit card. However, it has proven inconvenient to provide space on standard bank or credit card application forms for redundant indicia of reduced size suitable for encoding. Additionally, the indicia, being of reduced size, can not always be accurately coded so that during decoding, the indicia is not always clearly and accurately reproduced. Moreover, with small indicia, more light and/or time is required to properly expose the photosensitive film.

Finally, the Girard system encoded all of the indicia exposed to the photosensitive film. Consequently, the encoded indicia, after being affixed to the card, had to be viewed through a decoding viewer to indentify the encoded indicia so that corresponding additional uncoded indicia can be embossed on the card.

SUMMARY OF THE INVENTION

In accordance with a preferred embodiment of the invention, an indicia encoding system for the pictorial encoding of indicia is provided which comprises an objective lens fixedly mounted to a base and a carriage that is pivotally mounted on the base and has a rotation mode between an initial tilting position and a final tilting position. A photosensitive film holder is mounted onto the carriage and is slidably positionable in a direction parallel to the pivotal axis of the carriage for exposing to light transmitted through said lens only selected portions of the photosensitive film during each carriage rotation mode. A bellows interconnects the lens holder and the film holder and is deformable as the film holder moves relative to the lens holder. A holder for the indicia to be encoded, pivotally mounted on the base, has a rotation mode synchronized to the rotation mode of the carriage. A graticule is mounted onto the bellows side of the film holder for encoding the indicia transmitted by the light from the indicia that passes through the graticule onto the film when the carriage and the indicia holder are in synchronous rotational modes. A picture of the indicia taken through the lenticular lens during the synchronized rotational modes of the film holder and the indicia holder is illegible and the picture must be viewed through a viewer provided with an identical lenticular lens in order to be "decoded".

Unlike the prior art the film holder is slidably mounted to the carriage on at least one shaft that runs parallel to the axis of rotation of the carriage and is accurately positionable along the shaft by a cam system. This system is reliable and will not bind up under repeated use.

Further unlike the prior art this system provides for about a two to one reduction in the size of the encoded indicia by the positioning of the objective lens on a portion of the lens holder that extends into the bellows. This lens positioning allows the indicia being photographed to be placed about twice the distance from the lens as the photosensitive film is, while allowing a longer bellows to be used so that the relative motion between the film holder and the lens holder is not restricted. This reduction in size shortens the photographic time by increasing the light transmitted to the film by about a factor of four. Additionally, special application forms which require indicia, such as signatures, entered in reduced form, from which a one to one encoded pictorial representation is made, are eliminated. With minor modifications, standard forms can be used and data can be entered thereon in a large and clear manner so that accurate encoding can be accomplished.

A further feature of this invention is that the lenticular lens is split so that a portion of the object being photographed is not encoded. Thus, an uncoded reference number in the form of, for example, a bar code is produced next to the encoded indicia. The reference number can directly relate to and verify additional nonconfidential data to be placed on the card.

Additional features and advantages of the invention will be set forth in, or apparent from, the detailed description of the preferred embodiments of the invention found hereinbelow.

BRIEF DESCRIPTION OF THE DRAWINGS

FIG. 1A is a perspective view of the indicia encoding system in an initial tilting position with the outer housing removed;

FIG. 1B is a perspective view of the indicia encoding system in a final tilting position with the outer housing removed;

DETAILED DESCRIPTION OF THE PREFERRED EMBODIMENTS

Referring to the Figures, a preferred embodiment of the indicia encoding system is depicted. The indicia encoding system includes a camera having a film holder with a graticule, such as, for example, a lenticular lens mounted thereon. The film holder is pivotable relative to the objective lens, the pivotal movement synchronized to the pivotal movement of a holder retaining the indicia to be encoded. This synchronized pivotal motion in combination with the placement of the lenticular lens between the objective lens and the film holder accounts for the encoded pictorial representation of the indicia produced on the film.

Figure 1:
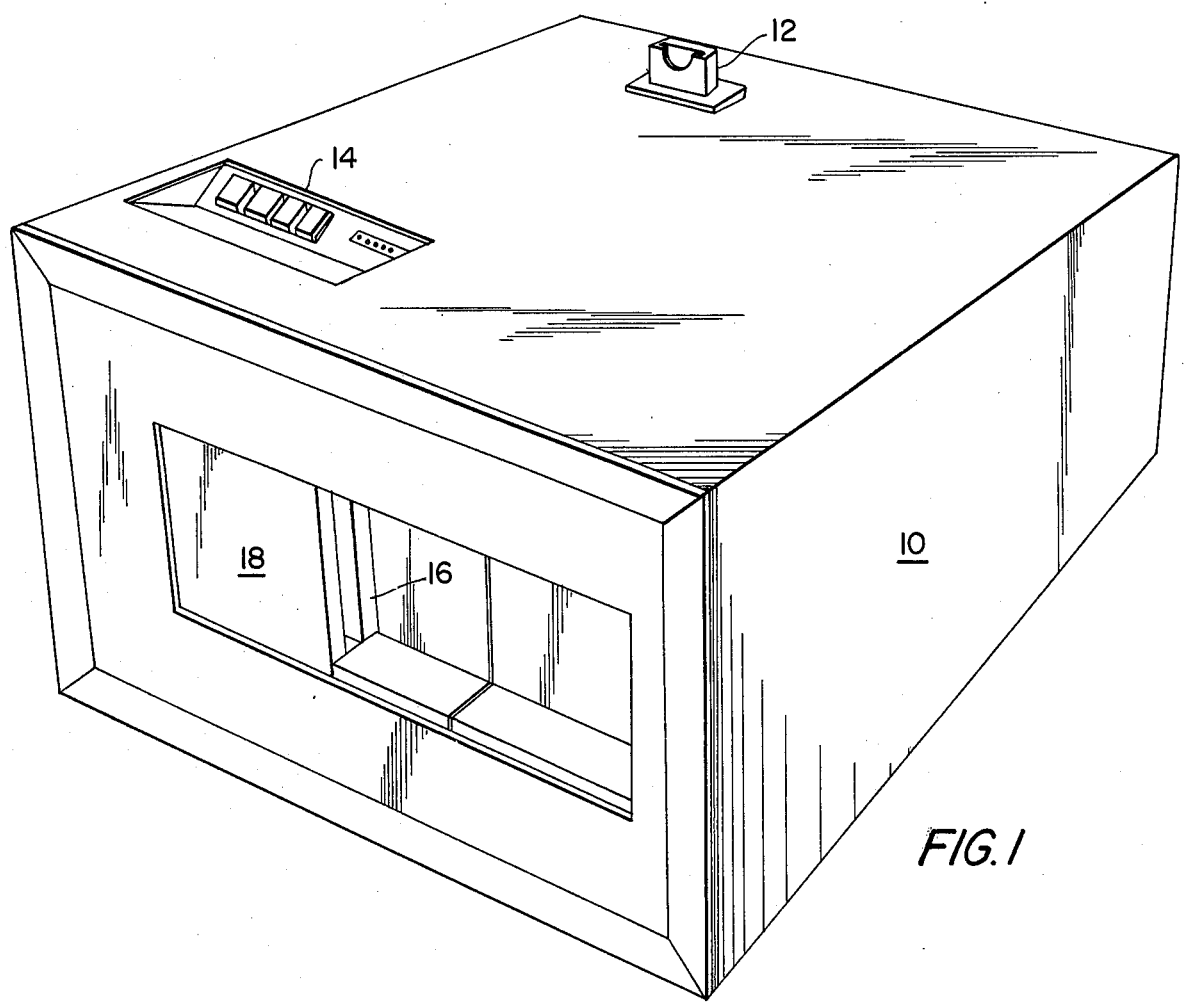
FIG. 1 is a perspective view of the indicia encoding system in accordance with the invention.

Referring to FIG. 1, the indicia encoding system, depicted in perspective, includes a removable housing 10 with a slot 12 into which the indicia to be encoded is dropped, and a central panel 14. Through slot 16, photosensitive film of the self developing variety is inserted into the film holder 18.

Figure 2:
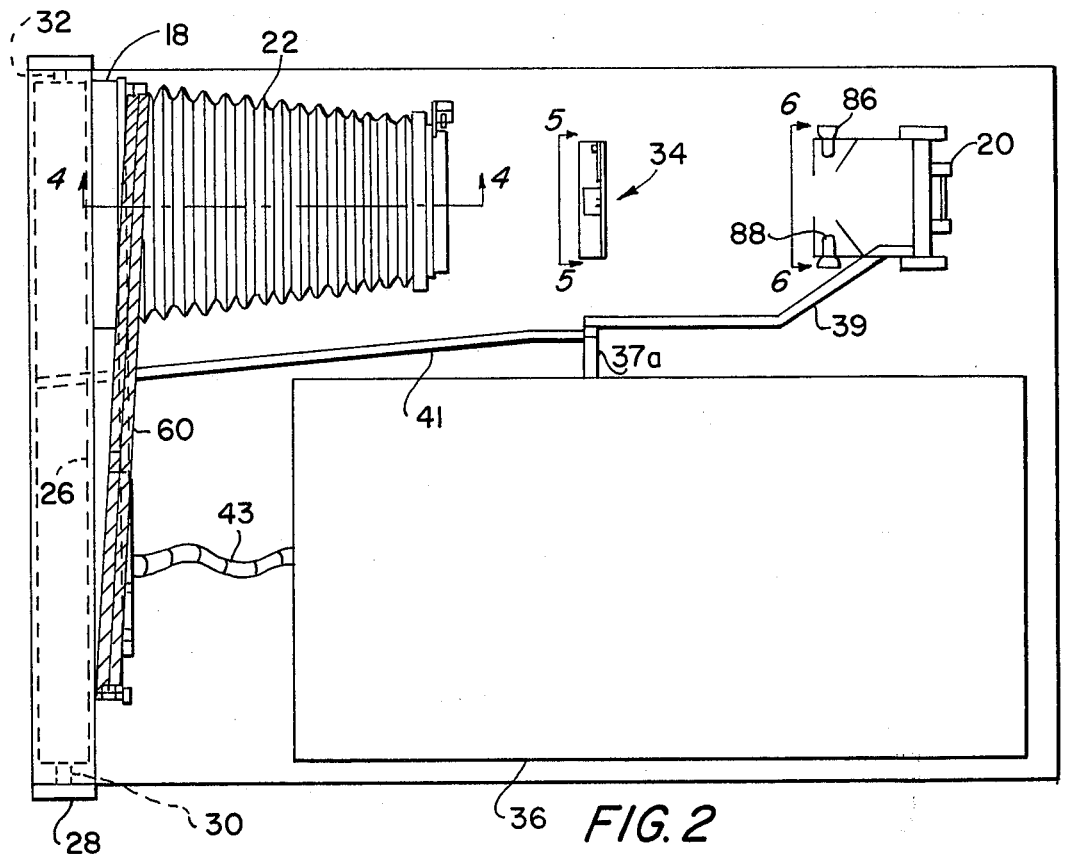
FIG. 2 is a plan view of the indicia encoding system with the housing removed.

FIG. 2 depicts the indicia encoding system with housing 10 removed. An indicia bearing card that is dropped through slot 12, is positioned by holder 20 during the encoding process. A camera bellows 22 is shown interconnecting film holder 18 and an objective lens holder 24. Film holder 18 is slidably mounted in carriage 26, shown in phantom (also see FIG. 3), that is pivotally mounted in a generally rectangular support frame 28 at pivot points 30 and 32. A shutter 34 (FIG. 2) is located between lens holder 24 and indicia holder 20. Additionally, the motor and timing mechanism is represented by block 36. The motor 36 drives an output shaft 37a to rotate through a partial revolution sequentially in opposite directions. A crank arm 37b is fixed to the end of output shaft 37a so that as the shaft 37a rotates the outer end of arm 37b swings through a substantial arc. Pivoted to the outer end of arm 37b is link 39 which has the opposite end thereof pivoted to indicia holder 20. Link 41 similarly interconnects the arm 37b with the lower end of carriage 26. It can be seen that by reason of this linkage connection, the carriage 26 and indicia holder 20 will pivot between end positions shown in FIGS. 1A and 1B as the motor rotates the output shaft in opposite directions.

Figure 3A:
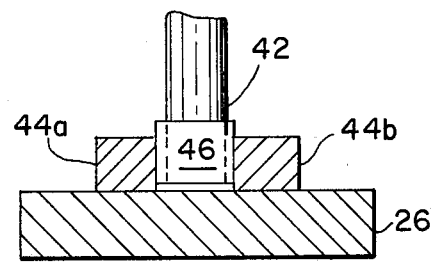
FIG. 3A is a cross-sectional view taken along line 3A—3A in FIG. 3.
Figure 3:
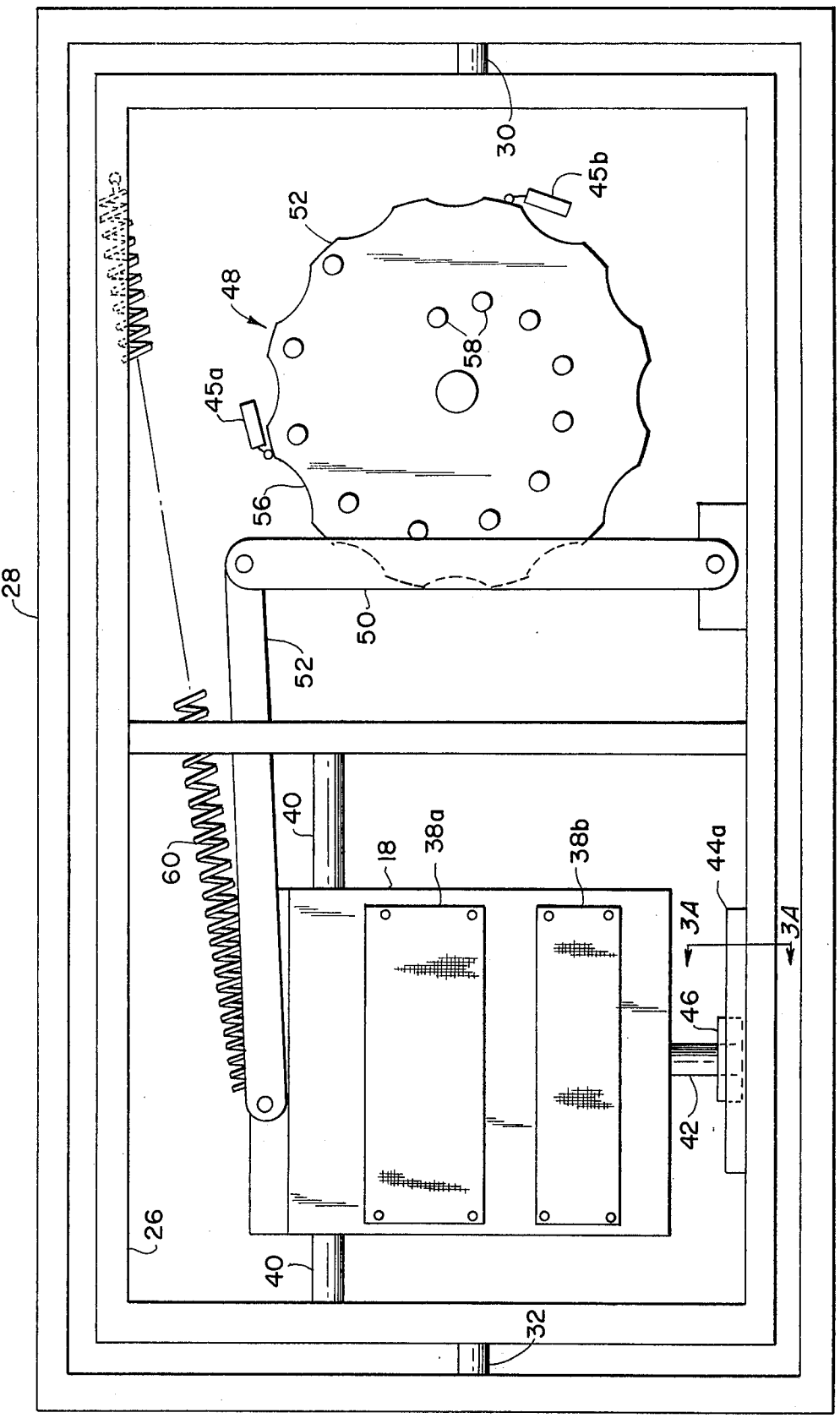
FIG. 3 is a front elevational view of the indicia encoding system with film holder and front panel removed.

Referring to FIG. 3, film holder 18 is depicted with a front plate portion thereof removed to reveal lenticular lenses 38a and 38b. The lenticules of lens 38 are located on the face thereof directed toward lens holder 24 (FIG. 2). Film holder 18 is slightly mounted onto a shaft 40 that is fixedly mounted within carriage 26 so as to be parallel to the pivot axis thereof. Additionally, a guide pin 42 extends downwardly from film holder 18 into a slot formed between two guide bars 44a and 44b (FIG. 3A) that are mounted on carriage 26 so as to be parallel to the axis of rotation thereof. A block 46, comprised of, for example, teflon, is slidably mounted on pin 42 and is positioned between bars 44a and 44b. Block 46 is spaced above the floor of the slot and is in sliding engagement with the sides thereof. Without block 46, pin 42 would develop flat sides as it reciprocated in the slot, causing film holder 18 to wobble and introducing undesirable variables during the encoding of the indicia.

Film holder 18 is slidingly positioned at various points on shaft 40 relative to carriage 26 by a cam 48 and first and second links 50 and 52. Cam 48 comprises a disc 54 with the periphery thereof formed to provide a cam surface including indentations 56. Indentations 56 and the peripheral portions of cam 28 between the indentations active microswitches 45a and 45b that in turn energize and deenergize motor and timing mechanism 36 which controls the position of cam 48 by the rotation of flexible shaft 43 connected thereto. Additionally, cam 48 includes a plurality of outwardly extending pins or roller bearings 58 mounted on a face thereof, these pins extending along a line spiraling outwardly from the center of disc 52. The axis of pins 58 is parallel to the axis of rotation of disc 52. First link 50 is pinned at one end thereof to carriage 26 and at the other end thereof to one end of link 52. The other end of link 52 is pinned to film holder 18. The spring 60 secured between film holder 18 and carriage 26 urges the film holder towards the cam 48. The spring 50 thus maintains link 50 in engagement with a pin 58. When energized, the motor 36 drives the cam 48 to successive stop positions so that the link 50 engages sequential pins 58 to move the film holder 18 along shaft 40 to permit individual portions of film to be successively exposed. The differences in radii between the radius to pin 50 located farthest from the center of disc 52 and the radius to the closest pin 58 determines the total linear travel of film holder 18 on shaft 40.

Figure 4:
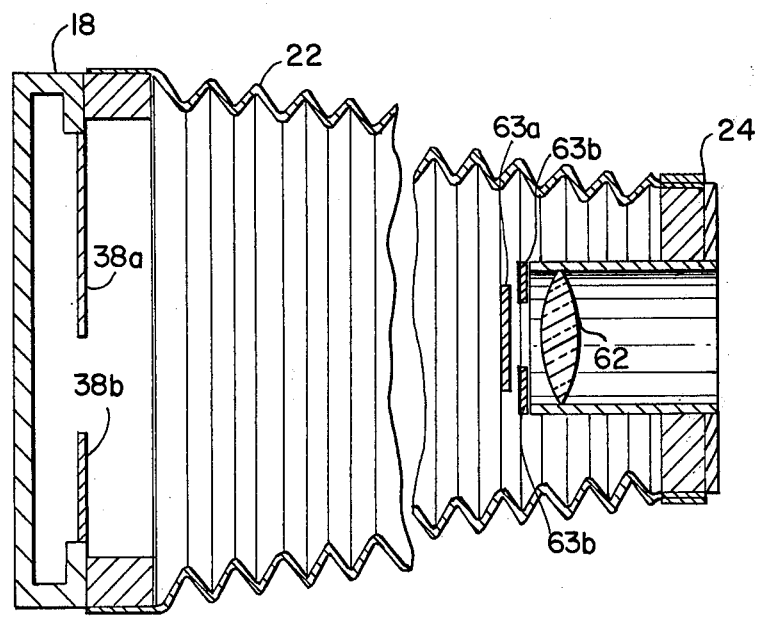
FIG. 4 is a cross-sectional view taken along line 4—4 in FIG. 2.

Referring now to FIG. 4, a sectional view of bellows 22 (FIG. 2) is depicted interconnecting film holder 18 and lens holder 24. Objective lens 62 is mounted onto a portion of lens holder 24 that extends into bellows 22. This mounting arrangement allows the lens to be spaced from film holder 18 about half the distance that the lens 62 is spaced from indicia holder 20 within the confines of housing 10 while utilizing a bellows large enough to allow film holder 18 to have the full range of motion relative to lens holder 24 necessary for encoding the indicia. A lens shutter 63a and an iris diaphragm 63b are located adjacent lens 62, opposite film holder 18.

Figure 5:
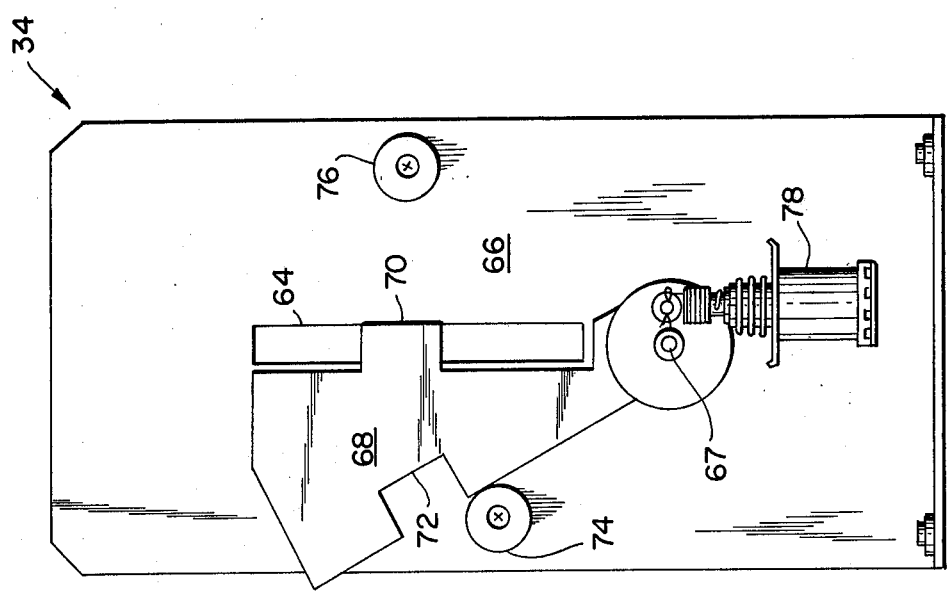
FIG. 5 is a front elevational view taken along line 5—5 in FIG. 2.

A shutter 34 is shown in FIG. 2 disposed between the lens holder 24 and the indicia holder 20. This shutter is shown in greater detail in FIG. 5. Shutter 34 comprises a mounting plate 66, having a slot 64 disposed therein. Pivoted on plate 66 at 67 is a wedge shaped shutter member 68. On one side of shutter member there is provided a central cut out 72 and at a corresponding point on the opposite side edge of shutter member 68 there is provided an outwardly extending tab 70. In the position shown in FIG. 5 the tab 70 covers a central portion of slot 64 so as to leave unobstructed the end portions of slot 64. When solenoid 78 drives pivoted shutter member 68 from a position in contact with stop 74 into the other end position in contact with stop 76, the cut out 72 leaves the central portion of slot 64 unobstructed with the remainder of slot 64 covered by member 68.

Figure 6:
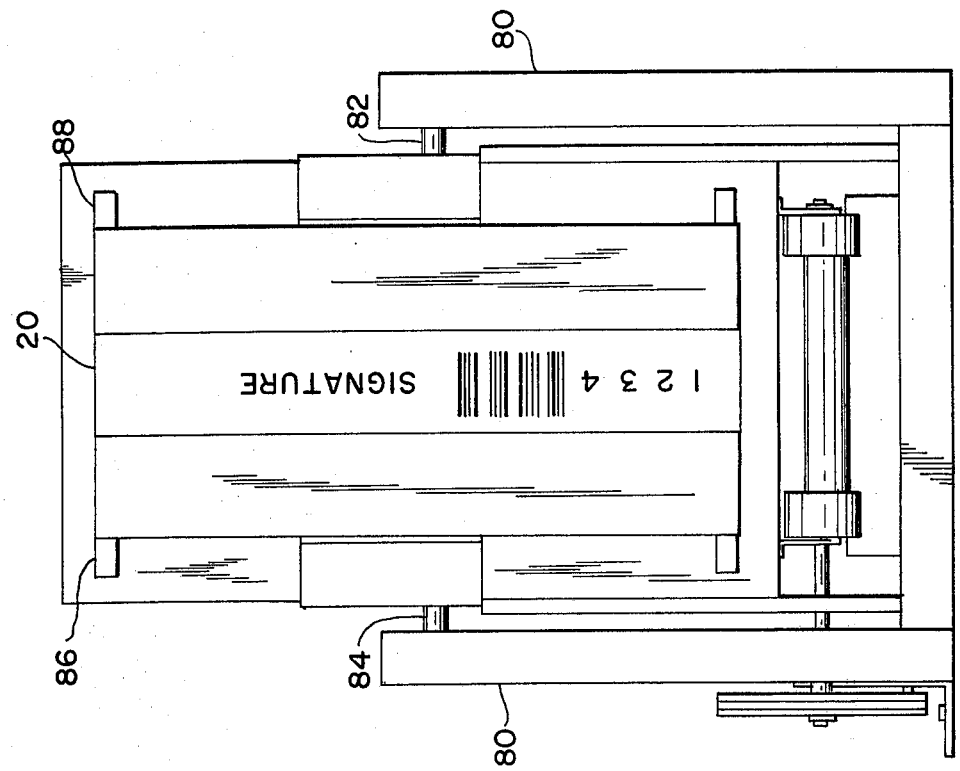
FIG. 6 is a front elevational view taken along line 6—6 in FIG. 2.

Referring to FIGS. 2 and 6, indicia holder 20 is depicted and in FIG. 6 a card bearing indicia is shown in place within the holder. The indicia on the card can include, for example, a bar code with a code number positioned on one side thereof and a signature on the other side thereof. Indicia holder 20 is pivotally mounted on a support frame 80 at pivot points 82 and 84. The card bearing indicia is mounted in holder 20 so as to be disposed about five-eights inches behind the pivot axis thereof. It has been determined that when the indicia bearing card is disposed on the pivotal axis of the holder 20 the indicia cannot be properly encoded and that for a two to one reduction in the size of the encoded indicia from the size of the original indicia, a position of at least five-eights inches behind the pivot axis is needed to effect proper pivotal encoding actions. Light sources 86 and 88 are fixedly mounted on indicia holder 20 so as to illuminate the indicia.

The operation of the indicia encoding system is as follows. Indicia such as, for example, the account number and a signature, is entered on an elongated, rectangular, detachable portion of an application for credit form, or in the alternative on a separate, elongate, rectangular card. The indicia need not be entered having a size contemplative of being placed on a credit card since a two to one reduction occurs during the encoding process. The rectangular card or detached portion of an application form is dropped through slot 12 of housing 10 (FIG. 1) into indicia holder 20 (FIGS. 2 and 6) and the start button in central panel 14 is depressed, energizing the encoding system including light sources 86 and 88. FIG. 6 depicts the indicia bearing card with an account number, a bar code, and a signature thereon. Wedge 68 of shutter 34 (FIG. 5) is pivoted toward stop 76 so that shutter slot 64 is completely blocked by wedge 68 except the central portion of slot 64 which is unobstructed by cut out 72. Lens shutter 63a is opened and an uncoded picture of the bar code is recorded on the central portion of the photosensitive film that does not have lenticular lens 38a or 38b interposed between the film and the indicia. The uncoded bar code can be used after development of the film for quick uncoded identification thereof. Lens shutter 63a is closed. Then wedge 68 of shutter 34 is pivoted into contact with stop 74 so that protrusion 70 of wedge 68 obstructs only the central portion of shutter slot 64 which was previously unobstructed. Carriage 26 with film holder 18 and, simultaneously, indicia holder 20 are pivoted into the generally parallel initial tilting position (FIG. 1A). Lens shutter 63a is opened and film holder 18 and indicia holder 20 are pivoted while remaining generally parallel from the initial tilting orientation to a final tilting position (FIG. 1B). During this movement, adjacent lenticular lenses 38a and 38b, and these lenses, in combination with the pivoted motion causes an encoded indicia to be recorded on this film. It should be noted that the encoding will also occur if pivotal motion is from the final (FIG. 1B) tilting position to the initial (FIG. 1A) tilting position. Then lens shutter 63a is closed and film holder 18 and indicia holder 20 are pivoted to a generally vertical position. At this point, the encoding process is complete and film holder 18 is ready to be indexed so that the next indicia can be encoded on the film. It is contemplated that twelve separate encoding exposures are to be recorded on each piece of self-developing film. To effect indexing, cam 48 rotates, causing linkage 52 to slide film holder 18 along shaft 40 to a new position ready for the next indicia to be dropped into slot 12.

After the film is fully exposed and self-developed, it is cut into strips, each strip corresponding to each encoded indicia, for placement onto a plastic card. The uncoded bar code allows for identification of the encoded indicia and for quick retrieval of additional information stored external to the indicia encoding system for embossing onto the plastic card.

It is contemplated that, with minor adaptation, non-self-developing, reel film can be used with this system. Additionally, it is to be understood that for each user of this system, different lenticular lenses creating different encoded results can be used so that the encoded indicia used by one user can not be decoded by another user. The lenticular lenses can be varied by, for example, changing the spacing between the lenticules, changing the orientation of the lenticules, or combining into one lens, groups of lenticles having different spacings and orientations. Each user would have his own specially designed lenticular lens and thus no other person, user of the indicia encoding system or not, could decode the indicia without learning the exact structure of the lenticular lens.

Although the present invention has been described relative to an exemplary embodiment thereof, it will be understood by those skilled in the art that variations and modifications can be effected in these embodiments without departing from the scope and spirit of the invention.

I claim:

1. An indicia encoding system comprising, in combination:

a base;

a carriage pivotally mounted on said base and having a rotation mode between an initial tilting position and a final tilting position;

an objective lens and a lens holder fixedly mounted onto said base;

a photosensitive film holder slidably mounted onto a shaft fixedly attached to said carriage and slidably positionable on said shaft in a direction parallel to the pivotal axis of said carriage for exposing to light transmitted through said lens only selected portions of the photosensitive film during each carriage rotation mode so that seriatim, one of a plurality of indicia can individually be encoded on a portion of the film during each rotation mode;

a camera bellows with a first end fixedly attached to said film holder and a second end fixedly attached to said lens holder, said bellows deformable as said film holder moves relative to said lens holder;

a holder for the indicia to be encoded pivotally mounted on said base and having a rotation mode synchronized to the rotation mode of said carriage; and a graticule mounted onto the bellows side of said film holder for encoding the data transmitted by the light from the indicia that passes through said graticule onto the film when said carriage and said indicia holder are in synchronized rotational modes.

2. An indicia encoding system in accordance with claim 1 wherein said carriage has a slot therein orientated parallel to said shaft, and wherein said film holder includes a sleeve coaxially and slidably mounted onto said shaft and a pin projecting into said slot.

3. An indicia encoding system in accordance with claim 2 wherein said slot has parallel planar faces and wherein said pin has a rectangular member slidably mounted thereon, said faces of said slot being slidingly engaged by said rectangular member for isolating said pin from sliding and wearing engagement with said slot faces.

4. An indicia encoding system in accordance with claim 1 further including:

a cam rotatably mounted to said carriage;

a first link pivotably mounted at one end thereof to said carriage and a portion of said link in contact with said cam;

a second link mounted at one end thereof to said film holder and at the other end thereof to said first link, the rotation of said cam changeably positioning said links so as to slide said film holder in a direction parallel to the pivot axis of said carriage.

5. An indicia encoding system in accordance with claim 4 wherein said cam includes a generally discshaped base and a plurality of spaced pins mounted to one face of said disc-shaped base and spaced along a line that spirals outwardly from the center of the disc, said first link in rolling engagement with at least one of said pins.

6. An indicia encoding system in accordance with claim 5 wherein said pins have roller bearings mounted thereon.

7. An indicia encoding system in accordance with claim 5 wherein said disc-shaped base has a cam surface along the peripheral edge of said disc-shaped base and including means for sensing said cam for stopping the rotation of said cam so that said film holder is positioned relative to said carriage along said shaft.

8. An indicia encoding system in accordance with claim 1 wherein said lens holder includes a frame mounted to said base and to which said bellows is fixedly attached and a member extending from said frame into said bellows with said lens mounted onto said member, said extending member for allowing a shortened distance between said lens and said film holder while maintaining the deformability of said bellows said film holder moves relative to said lens holder.

9. An indicia encoding system in accordance with claim 1 wherein said carriage and said indicia holder have a vertically stationary mode and further including a lens shutter having a plurality of aperture groupings, each grouping including at least one aperature, and each grouping for allowing light from only a portion of the indicia being photographed to enter said lens, said shutter indexable among said aperature groupings, at least one of said groupings for allowing light to strike said film holder when said carriage and said indicia holder are in the rotation mode and at least one of said groupings for allowing light to strike said film holder when said carriage is in the stationary mode.

10. An indicia encoding system in accordance with claim 9 wherein said graticule includes a planar area smaller than the planar area of the film held in said film holder and wherein one grouping of aperatures of said shutter only allows light to strike said graticule during the rotation mode of said carriage for encoding part of the indicia and wherein one grouping of aperatures only allows light to strike a portion of the film without said graticule adjacent thereto for reproducing unencoded indicia during the vertically stationary mode.

11. An indicia encoding system in accordance with claim 10 wherein the distance between said objective lens and said indicia holder is about twice the distance between said lens and said film holder.

12. An indicia encoding system in accordance with claim 11 wherein the indicia to be encoded is held about five-eights inches away from the pivot point of said indicia holder.

13. An indicia encoding system in accordance with claim 1 wherein the distance between said lens and said object holder is about twice the distance between said lens and said film holder.

14. An indicia encoding system in accordance with claim 1 wherein said graticule comprises a lenticular lens having substantially unidirectional continuously cylindrical lenticles on one side thereof facing said lens holder.

15. An indicia encoding system in accordance with claim 1 wherein said graticule comprises a lenticular lens having a plurality of sets of lenticles wherein at least one set has a different orientation with respect to the other sets and wherein at least one set has lenticles with spacing therebetween different from the other sets.

* * * * *